June 24, 1930.  C. E. NELSON  1,766,798
MECHANICAL MOVEMENT
Filed Dec. 19, 1928   2 Sheets-Sheet 1
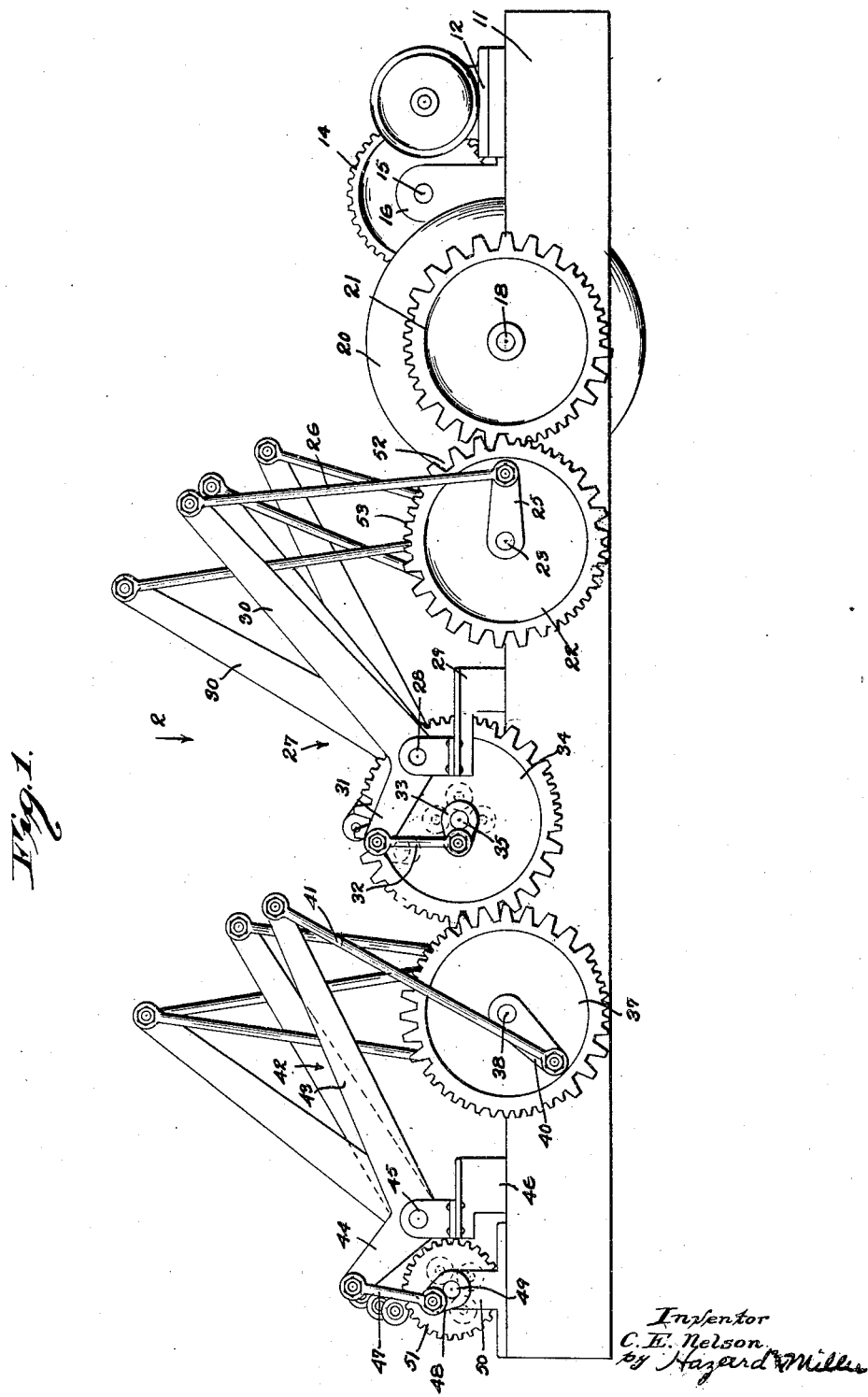

June 24, 1930.  C. E. NELSON  1,766,798
MECHANICAL MOVEMENT
Filed Dec. 19, 1928  2 Sheets-Sheet 2
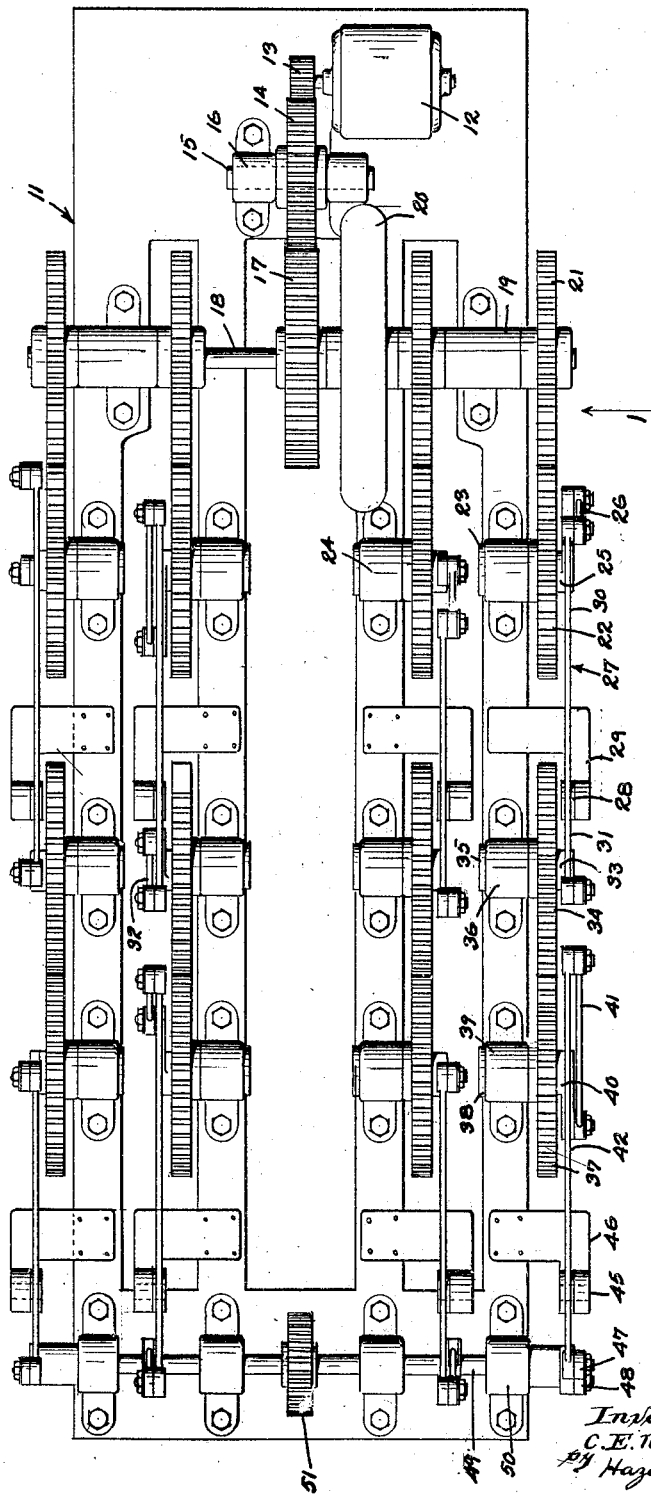

Patented June 24, 1930

1,766,798

UNITED STATES PATENT OFFICE

CHARLES E. NELSON, OF LOS ANGELES, CALIFORNIA

MECHANICAL MOVEMENT

Application filed December 19, 1928. Serial No. 327,070.

My invention is a mechanical movement utilizing a combination system of gears and rocking levers with links to transmit motion from a prime mover to the power takeoff.

An object of my invention is utilizing first a train of simple gears which receive power from a prime mover such as a motor. The last gear of this train has a crank connected thereto and this crank drives a pivoted lever through the medium of a link. This lever is formed in the shape of a bell crank and at its short end has another link connected thereto and which second link drives the crank of another gear. This latter gear meshes with a gear driven therefrom and this latter gear is connected to another bell crank system having a link connected to a crank. The second bell crank drives a power takeoff gear through the medium of a link connected to the small end of the second bell crank and to the crank on the takeoff gear.

Another object of my invention is the construction of a mechanical movement having the gear trains and oscillating bell cranks with the links arranged in multiples. For instance, I may arrange the system having four gears in parallel and four bell cranks with their links connected to the gears. This allows the connection at the links to the gears at one quarter circle apart.

My invention is illustrated in the accompanying drawings, in which;

Figure 1 is a side elevation taken in the direction of the arrow 1 of Fig. 2;

Fig. 2 is a plan of my invention taken in the direction of the arrow 2 of Fig. 1.

In constructing my invention I utilize a suitable base support 11 on which is mounted an electric motor 12. This motor has a pinion 13 on its shaft which drives an idler gear 14, such gear being on the shaft 15 mounted in journals 16 supported from the base. The gear 14 operates a driven gear 17 mounted on a transverse shaft. Such shaft is mounted in suitable journals 19 supported on the base. The shaft 18 carries a fly wheel 20. This shaft has a plurality of first drive gears 21, there being four such gears illustrated and these mesh with a first set of driven gears 22. These latter gears are mounted in stub shafts 23 each stub shaft being supported in a separate journal 24.

Each of the gears 22 has a crank 25 connected thereto and from each crank there is a link 26 pivotally connected to the crank. Each link is connected to a bell crank designated generally by the numeral 27, each bell crank being supported on its own pivot 28 mounted on a suitable bracket 29 supported from the base. The long ends of the bell cranks are designated at 30 and the short ends at 31.

Each of the short ends has a link 32 pivotally connected thereto and each of these links is connected to a short crank 33 on a second drive gear 34, there being four of these gears illustrated. The gears each have a stub shaft 35 which forms also the gear shafts; these stub crank shafts being mounted in journals 36.

The second driving gears 34 mesh with a second set of driven gears 37 each having a short crank shaft 38 mounted in journals 39. These latter shafts have cranks 40 which are connected to long links 41 of the second set of bell cranks 42. The long ends of the bell cranks are designated 43 and the short ends 44. These bell cranks each have their separate pivot 45 mounted on a bracket 46 supported from the base.

Each of the short ends of the bell cranks is connected by a short link 47 to a crank 48 of a cross shaft 49. This cross shaft is journaled in brackets 50 mounted at the base. It will be seen that all four of the bell cranks 42 are connected by the short links 47 to the common shaft 49. Such shaft has a single gear 51 which is the power takeoff for the device and may lead to any suitable driven mechanism which is not shown in the present illustrations.

I find it desirable to have the gears made with different sections having the teeth of coarse pitch as indicated at 52 and other sections having teeth of fine pitch as indicated at 53. While the teeth are all on the same pitch circle, this action of the coarse and fine teeth allows a slight amount of lost motion and prevents binding of the various gears through the action of the cranks being connected at quarter circles apart in the different gears. By this system of combined bell cranks and gear connections I may transmit power from the prime mover motor 12 to the final power takeoff 51 and secure an effective interference of power with comparatively little loss through friction.

Various changes may be made in the principles of my invention without departing from the spirit thereof as set forth in the description, drawings and claims.

I claim:

1. A mechanical movement comprising in combination a first drive gear and a first driven gear having teeth of varying pitch but meshing on the same pitch circle, a crank connected to the first driven gear, a pivotally mounted bell crank having a long arm connected by a link to said crank, the bell crank having a short arm with a link and a crank driven by said second link with means to take off power from said crank.

2. A mechanical movement comprising in combination a plurality of first drive gears having their axles in alinement, a plurality of first driven gears having their axles in alinement, the teeth of said gears being of varying pitch and meshing on the same pitch circle, a set of pivotally mounted bell cranks having their pivots in alinement and each having a long and a short arm, a crank connected to each of the first driven gears, each crank being connected by a link to the long arm of the bell crank, a second set of drive gears having their axles in alinement, a crank connected to each of said latter gears, a link connected to each of the latter cranks and each of said latter links being connected to the short arm of the bell crank, a second driven gear in mesh with the second drive gear, and having teeth of varying pitch operating on the same pitch circle, and means to take off power from the second driven gear.

In testimony whereof I have signed my name to this specification.

CHARLES E. NELSON.